(12) United States Patent
Richter

(10) Patent No.: US 10,119,408 B2
(45) Date of Patent: Nov. 6, 2018

(54) METHOD FOR CONNECTING A TURBINE BLADE OR VANE TO A TURBINE DISC OR A TURBINE RING

(75) Inventor: Karl-Hermann Richter, Markt Indersdorf (DE)

(73) Assignee: MTU AERO ENGINES AG, Munich (DE)

( * ) Notice: Subject to any disclaimer, the term of this patent is extended or adjusted under 35 U.S.C. 154(b) by 1425 days.

(21) Appl. No.: 13/816,269

(22) PCT Filed: Aug. 6, 2011

(86) PCT No.: PCT/DE2011/001561
§ 371 (c)(1),
(2), (4) Date: Feb. 26, 2013

(87) PCT Pub. No.: WO2012/022297
PCT Pub. Date: Feb. 23, 2012

(65) Prior Publication Data
US 2013/0156586 A1   Jun. 20, 2013

(30) Foreign Application Priority Data
Aug. 14, 2010   (EP) .................. 10 2010 034 337

(51) Int. Cl.
| F01D 5/30 | (2006.01) |
| B23K 26/342 | (2014.01) |
| B23K 15/00 | (2006.01) |
| B23K 26/32 | (2014.01) |
| B23K 35/02 | (2006.01) |

(Continued)

(52) U.S. Cl.
CPC ........ *F01D 5/3061* (2013.01); *B23K 15/0006* (2013.01); *B23K 15/0086* (2013.01); *B23K 26/32* (2013.01); *B23K 26/342* (2015.10); *B23K 35/0244* (2013.01); *B23K 35/24* (2013.01); *B23K 2201/001* (2013.01);
(Continued)

(58) Field of Classification Search
CPC ............ B23K 15/0006; B23K 15/0085; B23K 26/3213; B23K 26/345; F05D 2230/233–2230/234; F01D 5/3061
See application file for complete search history.

(56) References Cited

U.S. PATENT DOCUMENTS 6,355,086 B2 *  3/2002  Brown et al. ................... 75/235
7,455,740 B2 *  11/2008  Bostanjoglo et al. ........ 148/525
(Continued)

FOREIGN PATENT DOCUMENTS

| DE | 10337866 A1 | 3/2005 | |
| DE | 102007050142 A1 * | 4/2009 | ......... B23K 15/0046 |

(Continued)

*Primary Examiner* — Phutthiwat Wongwian
*Assistant Examiner* — Jessica Kebea
(74) *Attorney, Agent, or Firm* — Abel Law Group, LLP

(57) ABSTRACT

The present invention provides a method for connecting a turbine blade or vane to a turbine disk or to a turbine ring. First, a connecting body is formed on the turbine blade or vane by supplying an additive suitable for fusion welding to a surface of the turbine blade or vane, melting the additive on the surface, with incipient melting of the surface, and allowing the additive and the surface to solidify. Then, the connecting body is connected to the turbine disk or to the turbine ring by means of a fusion welding process.

19 Claims, 3 Drawing Sheets

(51) Int. Cl.
   B23K 35/24   (2006.01)
   B23K 103/18  (2006.01)
   B23K 101/00  (2006.01)

(52) U.S. Cl.
   CPC ...... *B23K 2203/18* (2013.01); *B23K 2203/26* (2015.10); *F05D 2230/232* (2013.01); *F05D 2230/237* (2013.01)

(56) References Cited

U.S. PATENT DOCUMENTS

| | | | |
|---|---|---|---|
| 7,634,854 B2* | 12/2009 | Meier | 29/889.1 |
| 7,735,223 B2* | 6/2010 | Clark et al. | 29/889.21 |
| 7,984,547 B2 | 7/2011 | Steinhardt | |
| 8,691,333 B2* | 4/2014 | Godfrey et al. | 427/189 |
| 8,875,392 B2* | 11/2014 | Richter | 29/889.1 |
| 8,884,182 B2* | 11/2014 | Lee et al. | 219/121.64 |
| 8,936,442 B2* | 1/2015 | Uihlein et al. | 416/241 R |
| 9,035,213 B2* | 5/2015 | Arjakine et al. | 219/121.64 |
| 2003/0118873 A1* | 6/2003 | Murphy | 428/701 |
| 2005/0005444 A1 | 1/2005 | Bostanjoglo et al. | |
| 2007/0003416 A1* | 1/2007 | Bewlay et al. | 416/241 B |
| 2007/0007260 A1 | 1/2007 | Steinhardt | |
| 2008/0182017 A1* | 7/2008 | Singh et al. | 427/142 |
| 2009/0113708 A1* | 5/2009 | Bamberg et al. | 29/889.21 |
| 2010/0028158 A1* | 2/2010 | Richter | 416/223 R |
| 2010/0284817 A1* | 11/2010 | Bamberg | B23K 15/0046 416/241 R |
| 2011/0135952 A1* | 6/2011 | Morris et al. | 428/548 |
| 2011/0198390 A1 | 8/2011 | Richter | |
| 2011/0217176 A1 | 9/2011 | Uihlein et al. | |
| 2011/0305578 A1* | 12/2011 | Smarsly | B23K 20/1205 416/223 R |
| 2012/0148413 A1* | 6/2012 | Richter et al. | 416/223 R |
| 2012/0273468 A1* | 11/2012 | Arjakine et al. | 219/76.12 |

FOREIGN PATENT DOCUMENTS

| | | | |
|---|---|---|---|
| DE | 102008052030 A1 | 4/2010 | |
| DE | 102008052247 A1 | 4/2010 | |
| DE | 102008057188 A1 | 5/2010 | |
| EP | 1464791 A1 | 10/2004 | |
| WO | WO 2010043209 A2 * | 4/2010 | B23K 20/1205 |

* cited by examiner

METHOD FOR CONNECTING A TURBINE BLADE OR VANE TO A TURBINE DISC OR A TURBINE RING

BACKGROUND OF THE INVENTION

1. Field of the Invention

The invention relates to a method for connecting a turbine blade or vane to a turbine disk or a turbine ring for a turbine stage of a turbomachine, in particular of a thermal gas turbine. The invention furthermore relates to a turbine stage for a turbine of a turbomachine.

2. Discussion of Background Information

Such a method for connecting a turbine blade or vane to a turbine disk or a turbine ring and also such a turbine stage comprising a turbine disk or a turbine ring which is connected at least indirectly to one or more turbine blades or vanes are known from the prior art. The turbine stage serves for its part for arrangement in a single-stage or multi-stage turbine of a turbomachine formed, in particular, as a thermal gas turbine. Progression in the construction of gas turbines in this respect places ever higher demands on the materials used, however. The turbine blades or vanes serving as guide vanes or rotor blades are therefore produced substantially as polycrystalline, single-crystal or directionally solidified cast parts made of high-temperature-resistant base alloys. Turbine blades or vanes manufactured from composite materials capable of withstanding high temperatures are likewise known.

However, this configuration has the effect that the turbine blades or vanes cannot be fusion welded or can only be fusion welded with great difficulty. A connection to a turbine disk which can be fusion welded or a corresponding turbine ring, which can be manufactured from a nickel base alloy, is therefore not possible using conventional fusion welding processes and leads to considerable additional costs. Alternatively, friction welding or diffusion welding processes are known for establishing an at least indirect connection between the turbine blade or vane and the turbine disk or turbine ring, but these processes require a high outlay for apparatus. In addition, temperatures which are incompatible for common base alloys may arise in these welding processes.

DE 10 2008 052 030 A1 discloses a method in which firstly a connecting body made of a material suitable for fusion welding is formed on the at least one turbine blade or vane by means of a cold spraying process, and then the connecting body is connected to the turbine disk or the turbine ring by means of a fusion welding process. In this context, a cold spraying process is referred to as a coating process in which the material of the later connecting body is applied to the turbine blade or vane at very high speed in powder form. The connection strength which can be achieved with this method is, however, inadequate for typical turbine applications.

It is an object of the present invention, therefore, to provide a method of the type mentioned in the introduction which achieves a high connection strength with little outlay. It is a further object of the invention to provide a turbine stage which can be produced with little outlay having a turbine disk or a turbine ring and at least one turbine blade or vane connected thereto with a high strength.

SUMMARY OF THE INVENTION

The present invention provides a method for connecting a turbine blade or vane to a turbine disk or a turbine ring. The method comprises (a) forming a connecting body on the turbine blade or vane by supplying an additive suitable for fusion welding to a surface of the turbine blade or vane,
(b) melting the additive on the surface of the turbine blade or vane, with incipient melting of the surface,
(c) allowing the additive and the surface to solidify; and
(d) connecting the connecting body to the turbine disk or the turbine ring by a fusion welding process.

In one aspect of the method, the melting of (b) may be effected by a laser beam and/or an electron beam that is guided over the surface. For example, the laser beam and/or electron beam may be operated with a power of from 100 W to 2000 W, e.g., about 400 W.

In another aspect, the connecting body may be formed by a laser beam melting process and/or an electron beam melting process. For example, a laser beam and/or an electron beam may be guided over the surface with a track spacing of from 0.01 mm to 0.2 mm, e.g., about 0.03 mm, and/or with a scanning speed of from 50 mm/s to 1000 mm/s, e.g., about 300 mm/s. Further, the connecting body may be formed in layers. The layers may, for example, have a thickness (d) of from 20 μm to 200 μm, e.g., 50 μm.

In a still further aspect of the method of the present invention, the additive may be supplied in powder form with a mean grain diameter of from 10 μm to 100 μm, e.g., from 30 μm to 50 μm.

In another aspect of the method, the connecting body may be formed by a laser beam deposition welding process and/or an electron beam deposition welding process. For example, a laser beam or electron beam may be guided over the surface with a track spacing of from 0.1 mm to 2 mm, e.g., about 0.5 mm and/or a feed rate of from 50 mm/s to 2000 mm/s, e.g., about 500 mm/s. Further, the connecting body may be formed in layers. The layers may have a thickness (d) of, for example, from 0.05 mm to 2 mm, e.g., about 0.25 mm.

In another aspect of the method, after formation thereof, the connecting body may be subjected to hot isostatic pressing and/or may be machined with the removal of material and/or electrochemically, for example, precision-machined.

The present invention also provides a turbine stage for a turbine of a turbomachine having a turbine disk or a turbine ring which is connected at least indirectly to at least one turbine blade or vane by a connecting body formed on the turbine blade or vane by the method of the present invention as set forth above (including the various aspects thereof).

The concept on which the present invention is based consists in the fact that a connecting body made of an additive suitable for fusion welding is generated on the turbine blade or vane by supplying the additive to a surface of the turbine blade or vane and melting it on said surface, with the surface itself being incipiently melted. Since the additive fed to the surface is melted completely, the surface—unlike when connecting solid components by means of a fusion welding process—is not exposed to any considerable mechanical stresses, and therefore negative changes in material such as the formation of cracks are avoided even in the case of a turbine blade or vane which consists of a material which is not suitable for fusion welding. Since the generated connecting body consists of the additive suitable for fusion welding, the connecting body can be connected to the turbine ring or the turbine disk by a fusion welding process.

The complete melting of the additive makes it possible to generate the connecting body in dense form and therefore with an optimum mechanical stability. Since the surface of the turbine blade or vane is incipiently melted during the generation of the connecting body, the connection between the connecting body and the turbine blade or vane has a high strength, as does the connection provided by fusion welding between the connecting body and the turbine disk or the turbine ring. This makes it possible overall to achieve a high connection strength between the turbine blade or vane and the turbine disk or the turbine ring. Since complicated apparatuses are not required either for generating the connecting body or for the fusion welding step, the method can be carried out easily and with few demands in terms of apparatus.

The dependent claims contain advantageous configurations and improvements of the invention.

According to one preferred development, the connecting body is formed in the region of a blade or vane root of the turbine blade or vane and/or as a blade or vane root of the turbine blade or vane. This makes it possible to achieve a particularly simple and mechanically stable connection between the turbine blade or vane and the turbine disk or the turbine ring by way of the connecting body.

According to one preferred development, the melting is effected by a laser beam or/and an electron beam guided over the surface. In this way, the quantity of heat required for melting can be provided in a spatially concentrated form with little power consumption. It is preferable for the laser beam or electron beam to be operated with a power of 100 W to 2000 W, in particular of approximately 400 W.

According to one preferred development, the connecting body is formed by means of a laser beam melting process (Selective Laser Melting, SLM) and/or an electron beam melting process (Electron Beam Melting, EBM). In this way, it is possible to achieve a high connection strength, in particular even without subsequent heat treatment. The mean equivalent diameter d$50$ of powder grains of the supplied additive is preferably between 10 µm and 100 µm, in particular approximately 30 µm. Particularly advantageous results are further achieved if the laser beam or electron beam is guided over the surface with a track spacing of 0.01 mm to 0.2 mm, in particular approximately 0.03 mm, and/or with a scanning speed of 50 mm/s to 1000 mm/s, in particular approximately 300 mm/s The connecting body is preferably formed in a multiplicity of layers, which are generated one on top of another, since it is thereby possible to obtain a connecting body which can be fusion welded particularly readily and has in principle any desired overall thickness. In particular, each layer has a thickness of 20 µm to 200 µm, preferably approximately 50 µm.

According to another preferred development, the connecting body is formed by means of a laser beam deposition welding process (Laser Metal Deposition, LMD) and/or an electron beam deposition welding process, which makes it possible to achieve particularly high working speeds. The additive can in this case be supplied in wire form or preferably in powder form, e.g. by supplying a noble gas mixed with the pulverulent additive. The mean grain diameter d$50$ is preferably between 10 µm and 100 gm, in particular approximately 50 µm. Particularly advantageous results are further achieved if the laser beam or electron beam is guided over the surface with a track spacing of 0.1 mm to 2 mm, in particular approximately 0.5 mm, and/or with a feed rate of 50 mm/s to 2000 mm/s, in particular approximately 500 mm/s In this case, too, the connecting body is preferably formed in a multiplicity of layers, which are generated one on top of another, since it is thereby possible to obtain a connecting body which can be fusion welded particularly readily and has in principle any desired overall thickness. In particular, each layer has a thickness of 0.05 mm to 2 mm, preferably approximately 0.25 mm. After the connecting body, or else in each case one layer, has been formed, it is preferable for the connecting body or the surface to be subjected to hot isostatic pressing for improving the strength. This applies both to SLM and EBM and also to LMD.

According to one preferred development, after it has been formed, e.g. after the fusion welding process, the connecting body is heat-treated, in particular solution-annealed and age-hardened, in order to further improve the density and strength.

According to one preferred development, the connecting body is finished, in particular precision-machined, before the fusion welding process, in order to achieve a particularly good surface quality and dimensional accuracy. The finishing is effected, for example, by electrochemical or/and by material-removing machining processes, such as milling and/or grinding.

In a further embodiment, it has proved to be advantageous if an electron beam welding process and/or a laser welding process and/or an inductive high-frequency pressure welding process and/or an inductive low-frequency pressure welding process is used as the fusion welding process. This makes it possible to achieve high welding speeds with extremely deep and narrow seams with little thermal distortion.

BRIEF DESCRIPTION OF THE DRAWINGS

The invention will be explained in more detail hereinbelow on the basis of exemplary embodiments with reference to the accompanying figures of the drawing, in which.

Additionally.

In the figures, the same reference signs denote identical components or components with an identical function, unless indicated to the contrary.

DETAILED DESCRIPTION OF THE INVENTION

Figure 1:
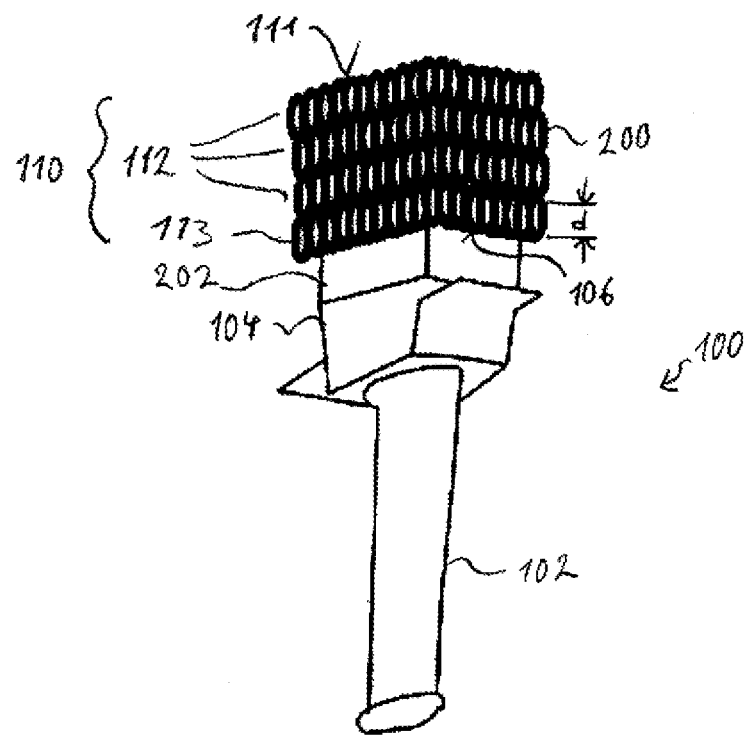
FIG. 1 shows a perspective view of a turbine blade or vane with a connecting body for connection to a turbine disk and/or a turbine ring according to one embodiment of the inventive method.

FIG. 1 shows a perspective view of a turbine blade or vane 100 for a turbomachine, such as e.g. a thermal gas turbine. The turbine blade or vane 100 has a main blade or vane part 102 and a blade or vane root 104, which both consist of a material 202 which is not suitable for fusion welding, such as a nickel-based cast material.

In order to connect the turbine blade or vane 100 to a turbine disk or a turbine ring (which are not shown), a connecting body 110 has been built up in a plurality of layers 113, 112 from an additive 200 suitable for fusion welding, such as e.g. the nickel-base material "INCONEL 718", on a surface 106 located on a side of the blade or vane root 104 which faces away from the main blade or vane part 102.

FIG. 1 shows a state in which the connecting body has been built up purely by way of example from four layers 200 lying one on top of another.

To form the connecting body 110 on the surface 106 of the turbine blade or vane 100, use is made for example of a laser beam deposition welding process or electron beam deposition welding process, in which the additive 200 is fed to the surface 106 in wire form or in powder form in a noble gas atmosphere, such as e.g. argon, or in vacuo. By way of example, "INCONEL 718" is blown onto the surface 106 in powder form with a mean grain size of approximately 50 µm mixed with argon. At the same time, a laser beam or electron beam with a power of approximately 400 W is allowed to sweep over the surface in lines, the track spacing between adjacent lines being approximately 0.5 mm and the feed rate being approximately 500 mm/s Preferably without preheating of the surface 106, the thermal action of the laser beam or electron beam melts both the additive 200 fed to the surface and also a thin top layer of the material 202 of the blade or vane root 104. Once the laser beam or electron beam has left a region of the surface 106, both the additive 200 and the surface 106 solidify, entering into a permanent connection. By passing over the entire surface 106, the dimensions of which correspond to a desired cross section of the connecting body 110, a bottommost layer 113 of the connecting body which is permanently connected to the blade or vane root 104 is formed.

Then, further layers 112 are applied in succession to the bottommost layer 113 in the same way, the thickness d of the layers 113, 112 being, for example, approximately 0.25 mm. Each new layer 112 is formed in each case on the exposed surface 111 of the preceding layer, until a desired height of the connecting body 110 has been reached. In this case, the exposed surface 111 can be subjected to hot isostatic pressing, for example in each case after the formation of a layer or a fixed number of layers.

Figure 2:
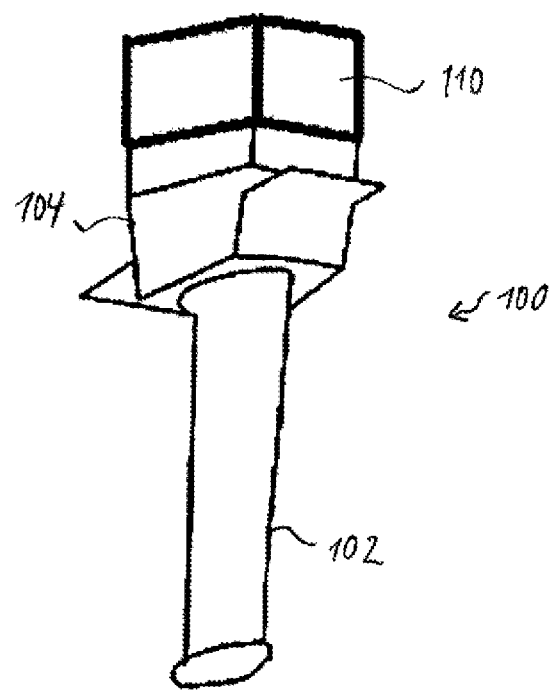
FIG. 2 shows a perspective view of the turbine blade or vane shown in FIG. 1 after finishing of the connecting body according to one embodiment.

FIG. 2 shows a perspective view of the turbine blade or vane shown in FIG. 1 after a further step, in which the connecting body 110 has been brought into a desired exact shape with a high surface quality by finishing, such as milling, grinding and/or electrochemical treatment. Before or after the finishing, it is possible for the turbine blade or vane 100 including the connecting body 110 to be heat-treated. Then, the connecting body 110 is connected to the turbine disk or the turbine ring by fusion welding.

Figure 3:
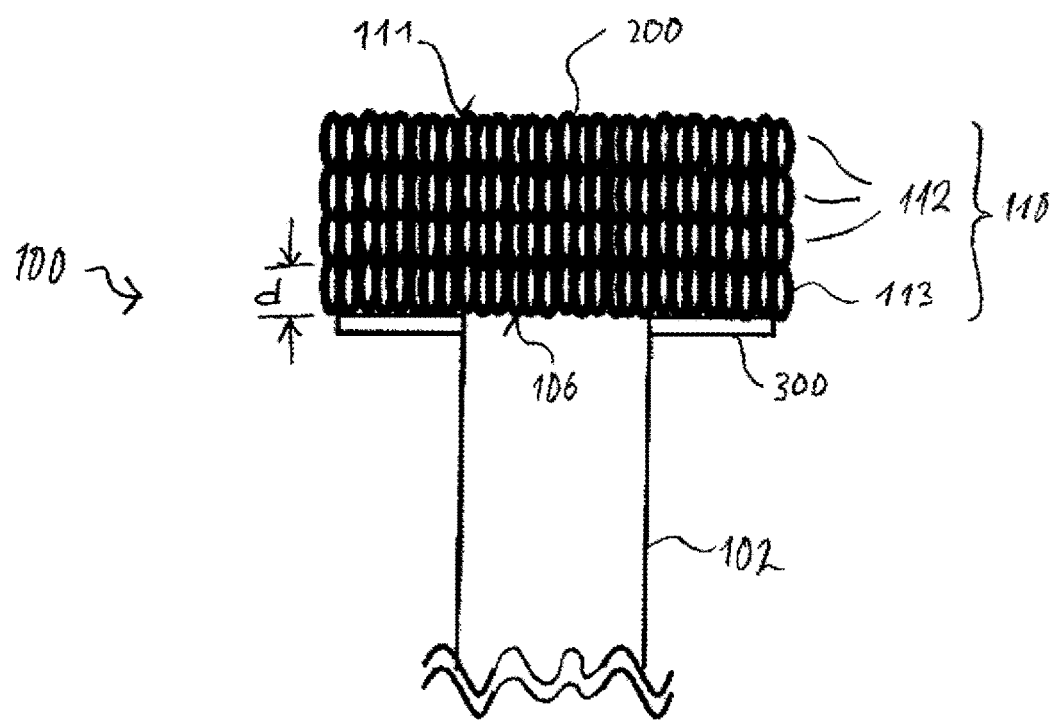
FIG. 3 shows a side view in the form of a detail of a turbine blade or vane during the formation of a connecting body for connection to a turbine disk and/or a turbine ring according to one embodiment.
Figure 4:
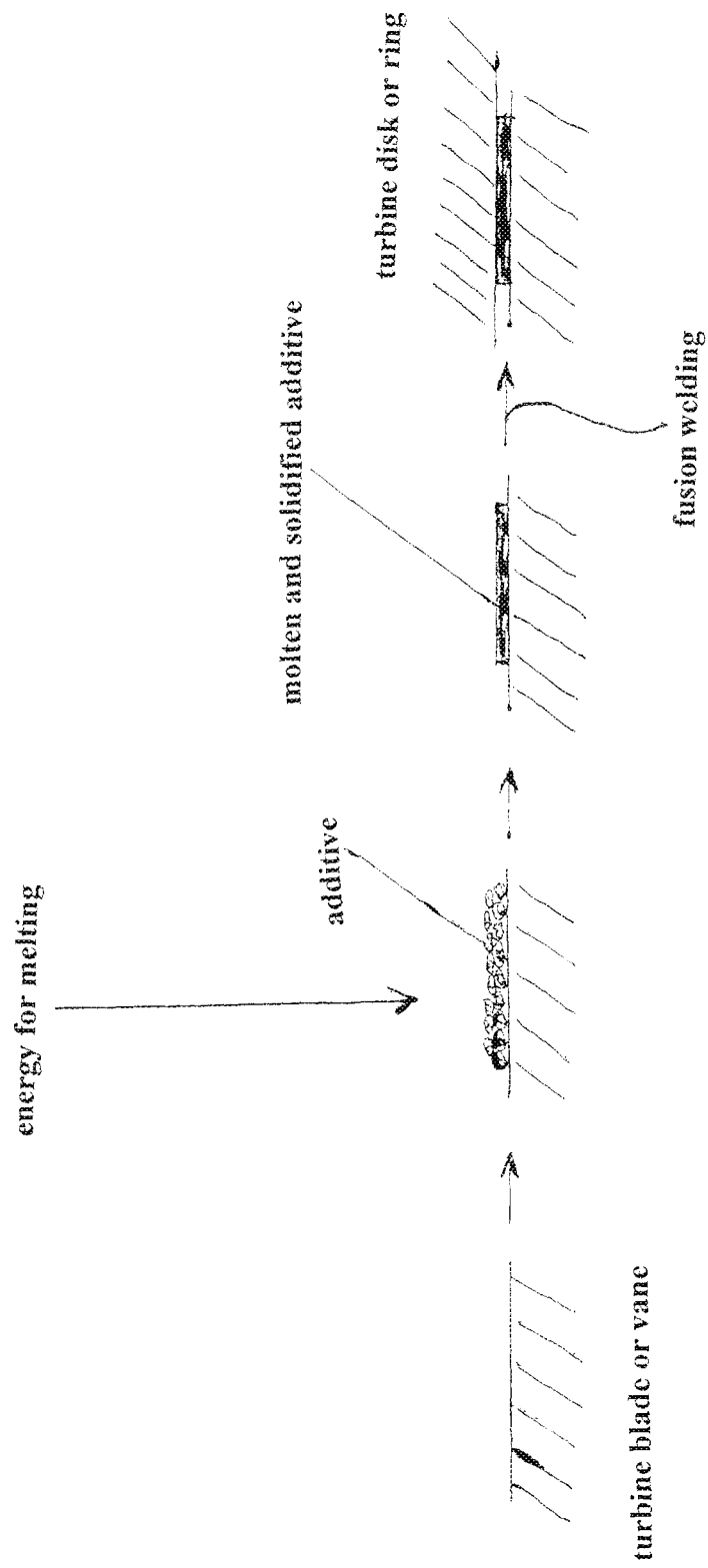
FIG. 4 is a purely schematic representation of the method of the present invention.

FIG. 3 shows a side view in the form of a detail of a further turbine blade or vane 100 during the formation of a connecting body 110. The bottommost layer 113 of the connecting body 110 has a larger cross section than the main blade or vane part 102, since the connecting body 110 itself forms the blade or vane root of the turbine blade or vane 100. To support the connecting body as it is being generated, a mask 300, which can have a single-part or multi-part form, was fixed in relation to the main blade or vane part 102 before the formation of the bottommost layer 113. If it has a single-part form, the mask can be shrunk, for example, onto the main blade or vane part 102 or—if it is not to be formed exclusively by the connecting body 110—onto the blade or vane root. After the connecting body 110 has been formed, the mask can be removed again, e.g. during finishing as described in relation to FIG. 2.

In alternative embodiments of the inventive method, the connecting bodies 110 shown in FIGS. 1 to 3 are formed by a laser beam melting process or/and electron beam melting process. To this end, the turbine blade or vane 100 is arranged in a powder bed of a powder of the additive 200 having a grain size d50 of e.g. 30 µm, in such a manner that the surface 106 of the turbine blade or vane 100 on which the connecting body 110 is to be formed is coated with a uniform powder layer. Then, a laser beam or electron beam with a power of approximately 400 W is passed over the powder-coated, preferably non-preheated surface 106, the track spacing and scanning speed being, for example, 0.03 mm and 300 mm/s, respectively. Then, the turbine blade or vane 100 is lowered in the powder bed by the magnitude of the layer thickness d, e.g. 50 µm, and again coated with a powder layer of the additive. This operation is repeated until the desired height of the connecting body 110 has been reached. Then, the connecting body 110, if appropriate after finishing as described above, is connected to the turbine disk or the turbine ring by fusion welding.

Although the present invention has been described here on the basis of preferred exemplary embodiments, it is not restricted thereto, but instead can be modified in diverse ways. By way of example, it is possible to machine a plurality of turbine blades or vanes at the same time. If laser beam melting processes or electron beam melting processes are used, to this end a plurality of turbine blades or vanes 100 are placed in the powder bed in such a manner that the surfaces 106 all lie in a plane which serves as the basis for the generative construction. If laser beam deposition welding processes or electron beam deposition welding processes are used, numerous turbine blades or vanes can be placed in a suitable holding apparatus in the working chamber.

The connecting body can be connected to the turbine ring or the turbine disk not only by directly welding the connecting body to the turbine ring or the turbine disk, but also by fusion welding the connecting bodies of a multiplicity of corresponding turbine blades or vanes to form a blade or vane ring, which can then be arranged on the turbine ring or the turbine disk, for example by shrinking it on.

What is claimed is:

1. A method for connecting a turbine blade or vane to a turbine disk or a turbine ring, wherein the method comprises:
   (a) supplying an additive suitable for fusion welding to a surface of the turbine blade or vane,
   (b) melting the additive on the surface of the turbine blade or vane, with incipient melting of the surface,
   (c) allowing the additive and the surface to solidify to form a connecting body on the turbine blade or vane; and
   (d) connecting the turbine blade or vane to the turbine disk or the turbine ring by directly fusion welding the connecting body to the turbine disk or the turbine ring.

2. The method of claim 1, wherein the melting of (b) is effected by at least one of a laser beam and an electron beam that is guided over the surface.

3. The method of claim 2, wherein the at least one of a laser beam and an electron beam is operated with a power of from 100 W to 2000 W.

4. The method of claim 2, wherein the connecting body is formed by at least one of a laser beam melting process and an electron beam melting process.

5. The method of claim 4, wherein the at least one of a laser beam and an electron beam is guided over the surface with a track spacing of from 0.01 mm to 0.2 mm.

6. The method of claim 4, wherein the at least one of a laser beam and an electron beam is guided over the surface with a track spacing of about 0.03 mm.

7. The method of claim 4, wherein the at least one of a laser beam and an electron beam is guided over the surface with a scanning speed of from 50 mm/s to 1000 mm/s.

8. The method of claim 6, wherein the at least one of a laser beam and an electron beam is guided over the surface with a scanning speed of about 300 mm/s.

9. The method of claim 4, wherein the connecting body is formed in layers.

10. The method of claim 9, wherein the layers have a thickness (d) of from 20 µm to 200 µm.

11. The method of claim 4, wherein the additive is supplied in powder form with a mean grain diameter of from 10 µm to 100 µm.

12. The method of claim 2, wherein the connecting body is formed by at least one of a laser beam deposition welding process and an electron beam deposition welding process.

13. The method of claim 12, wherein a laser beam or electron beam is guided over the surface with a track spacing of from 0.1 mm to 2 mm.

14. The method of claim 12, wherein a laser beam or electron beam is guided over the surface with a feed rate of from 50 mm/s to 2000 mm/s.

15. The method of claim 12, wherein the connecting body is formed in layers.

16. The method of claim 15, wherein the layers have a thickness (d) of from 0.05 mm to 2 mm.

17. The method of claim 1, wherein after the connecting body has been formed the connecting body is subjected to hot isostatic pressing.

18. The method of claim 1, wherein after the connecting body has been formed, the connecting body is machined at least one of with the removal of material and electrochemically.

19. The method of claim 1, wherein the connecting body is formed in a region of a root of the turbine blade or vane and/or as a root of the turbine blade or vane.

* * * * *